US009617396B2

(12) United States Patent
Schubert et al.

(10) Patent No.: US 9,617,396 B2
(45) Date of Patent: Apr. 11, 2017

(54) METHOD FOR IN-SITU SYNTHESIS OF SILICON NANOPARTICLES

(71) Applicant: Commissariat A L'Energie Atomique Et Aux Energies Alternatives, Paris (FR)

(72) Inventors: Chloé Schubert, Tignes (FR); Olivier Poncelet, Grenoble (FR)

(73) Assignee: Commissariat a L'Energie Atomique et aux Energies Alternatives, Paris (FR)

( * ) Notice: Subject to any disclaimer, the term of this patent is extended or adjusted under 35 U.S.C. 154(b) by 191 days.

(21) Appl. No.: 14/379,677

(22) PCT Filed: Feb. 20, 2013

(86) PCT No.: PCT/IB2013/051371
§ 371 (c)(1),
(2) Date: Aug. 19, 2014

(87) PCT Pub. No.: WO2013/124795
PCT Pub. Date: Aug. 29, 2013

(65) Prior Publication Data
US 2015/0031794 A1    Jan. 29, 2015

(30) Foreign Application Priority Data

Feb. 22, 2012  (FR) .................................... 12 51606

(51) Int. Cl.
| C08J 3/215 | (2006.01) |
| H01B 3/30 | (2006.01) |
| H01B 3/40 | (2006.01) |
| C08K 7/26 | (2006.01) |
| H01B 3/42 | (2006.01) |
| C08K 3/36 | (2006.01) |

(52) U.S. Cl.
CPC ............... *C08J 3/215* (2013.01); *C08K 7/26* (2013.01); *H01B 3/302* (2013.01); *H01B 3/305* (2013.01); *H01B 3/306* (2013.01); *H01B 3/40* (2013.01); *H01B 3/422* (2013.01); *C08J 2300/24* (2013.01); *C08J 2367/02* (2013.01); *C08J 2379/08* (2013.01); *C08K 3/36* (2013.01)

(58) Field of Classification Search
CPC ...................................................... C08J 3/215
See application file for complete search history.

(56) References Cited

U.S. PATENT DOCUMENTS

| 6,008,291 | A | * | 12/1999 | Weinberger | ............ | C08J 3/2053 |
| | | | | | | 428/480 |
| 2005/0245665 | A1 | | 11/2005 | Chen | | |
| 2012/0038989 | A1 | * | 2/2012 | Louarn | ................... | G02B 1/111 |
| | | | | | | 359/580 |

FOREIGN PATENT DOCUMENTS

KR    2004 0059346 A    7/2004

OTHER PUBLICATIONS

International Search Report and Written Opinion from International Application No. PCT/IB2013/051371, dated Jul. 4, 2013.
Boger L, et al.; "Improvement of Fatigue Life by Incorporation of Nanoparticles in Glass Fibre Reinforced Epoxy"; *Composites Part A: Applied Science and Manufacturing*; vol. 41, No. 10; Oct. 1, 2010; pp. 1419-1424; XP027233927.
Huicheng Shi, et al.; "Preparation and Dielectric Properties of Epoxy/Silica Nanocomposites"; *Nanoelectronics Conference (INEC)*; 3rd International, IEEE; Jan. 3, 2010; pp. 999-1000; XP034645250.
Iyer G, et al.; "Dielectric Properties of Epoxy Based Nanocomposites for High Voltage Insulation"; *IEEE Transactions on Dielectrics and Electrical Insulation*; vol. 18, No. 3; Jun. 1, 2011; pp. 659-666; XP011357881.
Jiang, K et al.; "The Unique Dielectric Behaviour of Nanosilica Epoxy Composties"; 7th *IEEE Conference on Nanotechnology*; 2007; IEEE—NANO 2007; Hong Kong, China; Aug. 1-5, 2007; Piscataway, NJ; IEEE Service Center; Piscataway, NJ; Aug. 2, 2007; pp. 1101-1106; XP031307960.
Liu P., Zhang Q., He L., Xie Q., Ding H.; "Thermal and Mechanical Properties of Poly(urethane-imide)/Epoxy/Silica Hybrids"; *Journal of Applied Polymer Science*; vol. 117; May 12, 2010; pp. 3722-3728; XP002682293.
Nazir T., et al.; "Thermally and Mechanically Superior Hybrid Epoxy-Silica Polymer Films Via Sol-Gel Method"; *Progress in Organic Coatings*; vol. 69, No. 1; Sep. 1, 2010; pp. 100-106; XP027122759.
Ochi M, et al.; "Effects of Water Content in In-Situ Preparation of Epoxy/Silica Hybrid Materials;" *Society of Polymer Science*; vol. 64, No. 9; Sep. 2007; pp. 568-574; XP002682294.
Phonthamachia N et al.: "Solvent-Free One-Pot Synthesis of High Performance Silica/Epoxy Nanocomposites"; *Polymer*, vol. 51, No. 23; Oct. 29, 2010; pp. 5377-5384; XP027437376.

(Continued)

*Primary Examiner* — Megan McCulley
(74) *Attorney, Agent, or Firm* — Alston & Bird LLP

(57) ABSTRACT

The invention relates to a method for in-situ synthesis of silicon nanoparticles in a thermosetting polymeric matrix, the thermosetting and thermoset matrices obtained in this way and a material including same. The method includes the following steps: a) forming an aqueous-phase/organic-phase inverse emulsion, wherein the aqueous phase includes at least a basic catalyst and the organic phase includes at least a non-cross-linked (co)polymer precursor chosen from an aliphatic, cycloaliphatic or aromatic epoxy resin precursor, a polyester-imide precursor, an unsaturated/epoxy polyester (co)polymer precursor, a polyether/epoxy (co)polymer precursor and a polyurethane precursor; b) introducing, into the inverse emulsion formed in step a), at least one silicon precursor forming a complete network whereof the rate of hydrolysis is greater than the cross-linking speed of the (co)polymer and c) stirring the mixture obtained in step b) and heating to a temperature between 20° C. and 70° C.

20 Claims, 9 Drawing Sheets

(56) References Cited

OTHER PUBLICATIONS

Tomonori Iizuka et al.; "Effects of Nano Silica Filler Size on Treeing Breakdown Lifetime of Epoxy Nancomposites"; *Properties and Applications of Dielectric Materials*; 2009; ICPADM 2009; IEEE 9$^{th}$ International Conference on the, IEEE, Piscataway, NJ; Jul. 19, 2009; pp. 733-736; XP031529203.

Xingyi Huang et al.; "Influence of Nanoparticle Surface Treatment on the Electrical Properties of Cycloaliphatic Epoxy Nanocomposites"; *IEEE Transactions on Dielectrics and Electrical Insulation*; IEEE Service Center, Piscataway, NJ; vol. 17, No. 2; Apr. 1, 2010; pp. 635-643; XP011307624.

Yangyang, Sun et al; "A Novel Nanocomposite with Photo-Polymerization for Wafer Level Application"; *IEEE Transactions on Components and Packaging Technologies*; vol. 31, No. 1; Mar. 1, 2008; pp. 135-142; XP011346796.

\* cited by examiner

METHOD FOR IN-SITU SYNTHESIS OF SILICON NANOPARTICLES

FIELD

The invention relates to a method for in-situ synthesis of silica nanoparticles in a thermosetting polymer matrix as well as a method for synthesis of a polymer matrix doped with hardened silica nanoparticles.

It also relates to the polymer matrix doped with thermosetting silica nanoparticles obtained by the method of the invention for in-situ synthesis of silica nanoparticles in a thermosetting polymer matrix.

It also relates to the use of the matrixes obtained by the methods of the invention in the medium and high voltage electrical industry as well as the electrical materials comprising polymer matrixes doped with silica nanoparticles obtained by the methods of the invention.

BACKGROUND

Silica particles, of micro- or macro- or nanometric size, are widely used as fillers in polymer matrixes in order to endow said polymer matrix with particular properties.

Several approaches have been used until now for introducing the silica particles into a polymer matrix.

The first approach consists of mixing the thermosetting polymer matrix, before its polymerization or crosslinking or hardening, with the silica particles by mechanical mixing, for example using a mixer.

However, this technique does not give a homogeneous dispersion of the silica particles in the polymer matrix, or does but with great difficulty.

The second approach was to use synthesis by the sol-gel route.

A first method according to this approach employs a silicon alkoxide such as tetraethoxysilane (TEOS) or tetramethoxysilane (TEMOS) in a solution of alcohol and water. This mixture is then heated in order to hydrolyze the silicon alkoxide. Then an acidic or basic catalyst is added to condense the silica in the form of particles.

Although studies have shown that, after thermal treatment, organic-inorganic composites can be formed by this technique, none has revealed the presence of well-defined silica nanoparticles. Moreover, the immiscibility of organic polymers, such as the epoxy or polyester-imide resins, with an aqueous solution and the increased reactivity of the monomers in acidic or basic conditions makes it difficult to prepare a composite of silica nanoparticles or polyester-imide/silica nanoparticle.

A second method is described in Mascia et al. "Selective Repartition of In-Situ Generated Silica Produced During the Evolution of an Epoxide Network from a Homogeneous Precursors Mixture and Effects on Properties", Journal of Applied Polymer Science, Vol. 94, 1279-1290 (2004). In this method, silica particles are formed in situ in an epoxy-bisphenol A resin. This method comprises two steps: a step of obtaining a telechelic coupling agent, followed by a step of functionalization of the resin with said telechelic coupling agent. This method additionally requires the use of an acidic catalyst and leads to production of silica-perfluoroether microparticles during crosslinking of the polymer resin.

Matejka et al. describe a method in which silicon alkoxide is prehydrolyzed before being introduced into an epoxy-amine matrix. The mixture obtained is then crosslinked thermally to obtain an epoxy-silica hybrid polymer. A silica-epoxy interpenetrating network is thus formed. Although this synthesis is said to be in a single step, in which the components are added at the same time, hydrolysis of the alkoxide is first carried out in an acidic medium and then a change of pH is effected by adding polymeric base in excess. In particular, however, no well-defined silica particle is observed.

A third approach consists of making polymer matrix-silica nanoparticles composites starting from a bicontinuous phase system by functionalizing the polymer matrix, in a solvent or without solvent, and by using a coupling agent in order to create an epoxy-silica hybrid interphase and a silica network. But once again, formation of well-defined silica nanoparticles is not observed.

A fourth approach is described by Lee et al., "Nonaqueous Synthesis of Nanosilica in Epoxy Resin Matrix and Thermal Properties of Their Cured Nanocomposites", Journal of Polymer Science: Part A: Polymer Chemistry, Vol. 44, 755-768 (2006). This method consists of carrying out silica synthesis in a nonaqueous medium using an acid salt ($BF_3MEA$) as catalyst of TEOS. This salt allows silica nanoparticles to form in the epoxy resin (DGEBA). However, this technique generates ions, which is incompatible with application in the medium and high voltage electrical industry.

Finally, it has been proposed to introduce silica nanoparticles into a polymer matrix using a colloidal solution of silica. The colloidal solution of silica is mixed with the resin by mechanical means before polymerization.

Thus, in the methods for synthesis of a polymer matrix doped with silica nanoparticles, either the silica nanoparticles synthesized are poorly dispersed in the polymer matrix, or the method does not allow the synthesis of well-defined silica nanoparticles of controlled size. Moreover, the methods of synthesis of the prior art are multistep methods that use solvents and coupling agents, or else require functionalization of the polymer. In all these methods, synthesis of silica nanoparticles takes place during crosslinking of the polymer and not before.

SUMMARY

The aim of the invention is to allow the synthesis of silica nanoparticles in a polymer matrix, said nanoparticles having a controlled size, and being well dispersed in the polymer matrix, which makes it possible to obtain transparency of the final material, while maintaining low viscosity during procedures such as impregnation, coating and casting.

For this purpose, the invention proposes a method of synthesis of silica nanoparticles in-situ in the matrix containing the polymer precursor, before polymerization, by the sol-gel route with basic catalysis, without adding solvent or coupling agent and without functionalization of the precursor of the polymer matrix.

This method comprises the following steps;

a) forming an aqueous phase-organic phase inverted emulsion, in which the aqueous phase comprises at least one basic catalyst and the organic phase comprises at least one noncrosslinked (co)polymer precursor selected from a precursor of aliphatic, cycloaliphatic or aromatic epoxy resin, a polyester-imide precursor, a precursor of unsaturated polyester/epoxy (co)polymer, a precursor of polyether/epoxy (co)polymer and a polyurethane precursor;

b) introducing at least one silica precursor into the inverted emulsion formed in step a), forming a complete network whose rate of hydrolysis is greater than the rate of crosslinking of the (co)polymer and c) stirring the mixture obtained in step b) and heating to a temperature between 20° C. and 70° C.

In the method of the invention, preferably, no step of functionalization of the polymer precursor is employed and no solvent or coupling agent is added, as this is not necessary.

Preferably, the basic catalyst is a catalyst selected from ammonia and urea.

The pH is preferably above 10, more preferably above 11.

Still preferably, the silica precursor forming a complete network is selected from tetraethoxysilane (TEOS), tetramethoxysilane (TMOS), tetrakis(2,2,2-trifluoroethoxy)silane and tetrakis(1,1,1,3,3,3-hexafluoropropoxy)silane.

When the (co)polymer precursor is a precursor of polyether/epoxy (co)polymer or a polyester-imide precursor, steps a) and b) are preferably carried out in a double-wall reactor regulated to a temperature of 20° C. and step c) is carried out at 70° C.

In the method of the invention, the ratio of the weight of silica precursor to the weight of (co)polymer precursor is preferably between 1/100 and 35/100. It is preferably 8/100.

When the noncrosslinked (co)polymer precursor does not contain hardener in step a), the method of the invention further comprises a step of adding hardener to the mixture obtained after step c).

In this case, the hardener may be selected from the amines such as 1,10-decanediamide, 1,12-dodecanediamide, and 4,4'-diaminodiphenylsulfone, and the acid anhydrides such as Aradur®, methylhexahydrophthalic anhydride (MHHPA), methyltetrahydrophthalic anhydride (MTHPA), phthalic anhydride (PA), tetrahydrophthalic anhydride (THPA), hexahydrophthalic anhydride (HHPA).

The preferred hardener is an acid anhydride such as Aradur®, MHHPA, MTHPA, PA, THPA, or HHPA.

The invention also proposes a method for synthesis of a thermoset polymer matrix, doped with silica nanoparticles, which comprises the following steps:

a1) carrying out the method for in-situ synthesis of silica nanoparticles in a thermosetting polymer matrix according to the invention, b1) heating the thermosetting polymer matrix doped with silica nanoparticles obtained in step a1) at the temperature of hardening of the polymer matrix.

The invention further proposes a thermosetting polymer matrix doped with silica nanoparticles obtained by the method for synthesis of a thermoset polymer matrix, doped with silica nanoparticles, in which the silica nanoparticles have an average diameter measured by transmission electron microscopy (TEM JEOL 2000 FX) between 20 and 80 nanometers, inclusive.

The invention further proposes a thermoset polymer matrix doped with silica nanoparticles obtained by the method of the invention for in-situ synthesis of silica nanoparticles in a thermoset polymer matrix, in which the silica nanoparticles have an average diameter measured by TEM JEOL 2000 FX between 20 and 80 nanometers, inclusive.

The invention further relates to the use of a thermosetting polymer matrix doped with silica nanoparticles obtained by the method according to the invention for making a medium and high voltage dielectric material.

The invention also further relates to the use of a thermoset polymer matrix doped with silica nanoparticles, obtained by the method according to the invention, as a medium and high voltage dielectric material.

The invention finally relates to a dielectric material comprising a polymer matrix doped with silica nanoparticles obtained by the methods of the invention.

BRIEF DESCRIPTION OF THE DRAWINGS

The invention will be better understood and other features and advantages thereof will become clearer on reading the explanatory description given below, referring to the figures in which.

DETAILED DESCRIPTION

Figure 1:
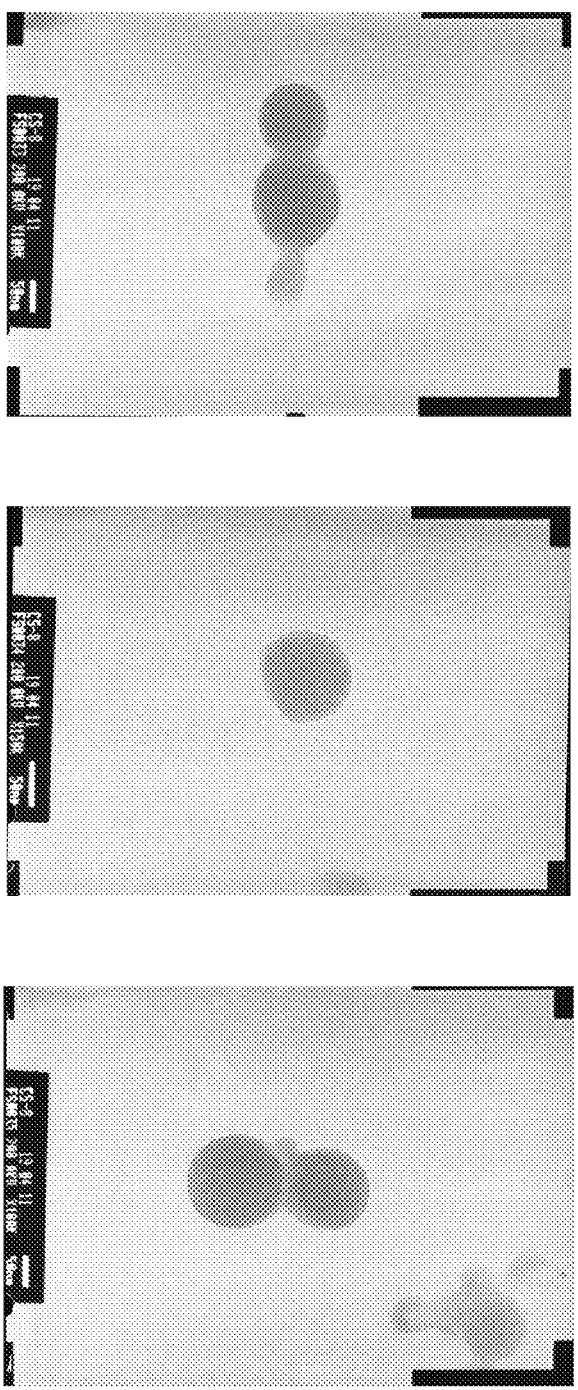
FIG. 1 shows images taken with the transmission electron microscope (TEM), revealing the morphology, size and distribution of the silica nanoparticles synthesized according to protocol I of example 1 (magnification ×100K)

In the present text, the term "thermosetting matrix" is used to denote the polymers or (co)polymers which, after thermal treatment (radiated heat) or physicochemical treatment (catalysis, hardener), polymerize forming a hardened three-dimensional network and will form the irreversibly hardened polymer or (co)polymer.

The term "(co)polymer precursor" denotes monomers and/or oligomers and/or prepolymers leading to formation of the (co)polymer.

The term "thermoset matrix" denotes the polymer or (co)polymer hardened by thermal or physicochemical treatment.

The term "hardened" is used to denote the state of the polymer matrix after the step of crosslinking of the polymer by thermal or physicochemical treatment. The term "(co)

polymer matrix" denotes a matrix in which the precursors of (co)polymers (monomers and/or oligomers and/or prepolymers) form a (co)polymer.

The terms "crosslinked", "crosslinkable" denote an arrangement, or a capacity to form, respectively, in a network (chains of polymers joined together by chemical bonds), hard (co)polymers of the hardened or hardenable polymer matrix.

The terms "resin" and "(co)polymer" are used interchangeably.

The term "nanoparticle(s)" denotes particles whose size is between 1 and 1000 nanometers, preferably below 100 nm.

In the sense of the invention, the term "a silica precursor forming a complete network" denotes a three-dimensional silica network forming discrete objects that are chemically stable. There is no interpenetration between the network formed by the polymer matrix and that formed by the silica precursor.

The terms "coupling agent" and "compatibilizing agent" denote a chemical compound ensuring better miscibility and better dispersion of the silica precursor and of the (co)polymer precursor, creating silica nanodomains. Owing to their chemical nature (molecules that are at least bifunctional), the coupling agents produce cohesion between the inorganic compounds and the organic matrix, creating chemical bonds between the (co)polymer precursor and the silica precursor. The principal coupling agents are of the glycidoxysilane type such as ((3-glycidoxypropyl) trimethoxysilane), the mercaptosilanes such as 3-mercaptopropyltrimethoxysilane, 3-mercaptopropylmethyldimethoxysilane, 3-mercaptopropyltriethoxysilane), the aminosilanes such as ((n-phenylamino)methyltrimethoxysilane, and (n-phenylamino)methyltriethoxysilane).

The term "functionalization of the (co)polymer precursor" denotes a step in which the polymer precursor is modified by one or more chemical functions, these chemical functions having the role of promoting bonding—chemical, physical or other—between the (co)polymer and the silica precursor, as is done in Mascia et al. cited above.

The term "solvent" denotes a liquid permitting dissolution or dilution of the silica precursor in the polymer matrix.

In the invention, the abbreviation TSM, for the English term "Thermal Step Method", signifies the method known in French as méthode de l'onde thermique ("thermal wave method").

The thermal step method is a nondestructive method that consists of measuring the TSC ("thermal simulated current") in order to determine the space charges of the material. The space charges are all the real charges, positive and negative, contained in the insulator, which produce a residual field leading to a local increase in electric field when the material is submitted to polarization. This local increase in electric field creates zones of weakness in the material that eventually degrade the insulating properties of the material.

In order to determine the space charges of an insulator, a voltage is applied to the sample (polarization) at a defined temperature for a defined time. The current (TSC), I(t), which is a function of the electric field E(x) corresponding to the space charges, is then measured.

$$I(t) = -\alpha C \int_0^D E(x) \frac{\partial \Delta T(x,t)}{\partial t} dx$$

Therefore the higher the value of the measured current, the more the material accumulates space charges and it will therefore be less resistant to electrical stresses (Polymer International 46 (1998) 81-92. Thesis C.D Pham (2009). The method for in-situ synthesis of silica nanoparticles in a thermosetting polymer matrix according to the invention allows synthesis of a thermosetting polymer matrix doped with silica nanoparticles in which the silica nanoparticles are formed in the unpolymerized and noncrosslinked polymer matrix and even without adding solvent or coupling agent and without employing any functionalization of the (co) polymer precursor or of the (co)polymer itself.

It is therefore a method that is very simple to implement as it does not require a step of functionalization of the (co)polymer or of its precursor, nor addition of solvents or coupling agents. This method makes it possible to obtain silica nanoparticles that are well dispersed in the polymer matrix and of controlled size.

Preferably, the (co)polymer precursor is a precursor of aliphatic, cycloaliphatic or aromatic epoxy resin such as Araldite®, D.E.R®, a precursor of polyester-imide such as Voltatex®, Damisol®, a precursor of unsaturated polyester/epoxy (co)polymer, a precursor of polyether/epoxy (co)polymer, a precursor of polyurethane (co)polymer.

This precursor constitutes the organic phase of the aqueous phase-organic phase inverted emulsion that must be formed for carrying out the method of the invention.

In the method of the invention, the aqueous phase comprises at least one basic catalyst.

Once the inverted emulsion has formed, a silica precursor forming a complete network and whose rate of hydrolysis is greater than the rate of crosslinking of the (co)polymer (at least 50 times higher) is introduced into this inverted emulsion.

A silica precursor forming a complete network, suitable for carrying out the method for in-situ synthesis of silica nanoparticles in a polymerizable matrix according to the invention, is tetraethoxysilane, tetramethoxysilane, or tetrakis(2,2,2-trifluoroethoxy)silane and tetrakis(1,1,1,3,3,3-hexafluoropropoxy)silane.

Of course, any other silica precursor forming a complete network and whose rate of hydrolysis is greater than the rate of crosslinking of the (co)polymer that occurs to a person skilled in the art can be used.

Regarding the basic catalyst, it can be any basic catalyst that occurs to a person skilled in the art, such as a volatile organic ammonium base giving weak hydrolysis and rapid condensation of the silica precursor, not generating any ion that might degrade the insulating properties of the matrix. Ammonia or urea will preferably be used.

Preferably, the ratio of the weight of silica precursor to the weight of (co)polymer precursor is between 1/100 and 35/100. More preferably, this percentage is 8/100.

The mixture of inverted emulsion and silica particles is first stirred and then heated at a temperature T° C. between 20° C. and 70° C. to form the desired (co)polymer and the silica nanoparticles.

When the (co)polymer precursor is a precursor of polyether/epoxy (co)polymer or a precursor of polyester imide, the steps of formation of an inverted emulsion and of addition of the silica precursor are carried out in a double-wall reactor regulated to a temperature of 20° C. and the step of stirring the mixture obtained and heating thereof is carried out at 70° C.

The thermosetting polymer matrix doped with silica nanoparticles obtained by the method for in-situ formation of silica nanoparticles in a thermosetting polymer matrix according to the invention is also an object of the invention. In this thermosetting polymer matrix, the silica nanoparticles have a diameter measured by TEM between 20 and 80 nanometers, inclusive. This matrix will be able to be stored or transported to the site where it is used, before forming it to obtain a thermoset article.

This thermosetting polymer matrix doped with silica nanoparticles may be used for making a medium and high voltage dielectric material.

To obtain a polymer matrix doped with thermally hardened silica nanoparticles, the thermosetting matrix doped with silica nanoparticles according to the invention is heated at the temperature of hardening of this thermosetting polymer matrix. A step of transforming the thermosetting polymer matrix to the desired form may be carried out.

The noncrosslinked (co)polymer precursor may already contain a hardener. In this case, to obtain the thermoset polymer matrix, the polymer matrix doped with hardened silica nanoparticles, it will be sufficient to heat the polymerizable matrix doped with silica nanoparticles according to the invention at its temperature of polymerization-hardening.

When the (co)polymer precursor does not contain hardener, the method for in-situ synthesis of porous silica nanoparticles in a thermosetting polymer matrix according to the invention comprises a step of adding hardener to the mixture obtained after the step of stirring the inverted emulsion-silica precursor mixture, and heating.

The thermoset polymer matrix doped with silica nanoparticles obtained by the method of the invention may be used as a medium and high voltage dielectric material.

Any dielectric material comprising a polymer matrix doped with silica nanoparticles obtained by the methods of the invention is also an object of the invention.

For fuller explanation of the invention, several embodiments thereof will now be described, as examples that are purely illustrative and nonlimiting.

EXAMPLES

Example 1

Synthesis of Nanoparticles in a Polyester/Epoxy Resin (Harzkomb resin EPE19A®).

The aim of the experiments described in this example is the in-situ synthesis of silica nanoparticles having different sizes. To achieve this aim, the silica nanoparticles were synthesized by the sol-gel route according to Stöber's principle. This method is based on hydrolysis followed by condensation of TEOS (tetraethoxysilane, density d=0.934 g/cm$^3$ (supplier's data), M=208.33 gmol$^{-1}$, Sigma Aldrich). These reactions take place in aqueous ammonia solution and from precursor of organic polymer Harzkomb EPE19A (precursor of polyester/epoxy resin based on bisphenol A-epichlorohydrin, marketed by Walter Mäder AG) where ammonia serves as catalyst for the reactions of hydrolysis and condensation of TEOS.

To obtain nanoparticles of different sizes, it is sufficient to vary the reaction conditions, such as the volume of the reactants, the reaction time and the temperature.

These two experiments lead to the production of silica nanoparticles having a size of 50 nm (protocol I) and 20 nm (protocol II), respectively.

1. Protocol for Synthesis of Nanoparticles with a Size of the Order of 50 nm (Protocol I)

To obtain particles of 50 nm, the following compounds were added in suitable proportions of water, of ammonia solution, of EPE19A resin and of TEOS. The procedure consists of adding, in the stated order, in a double-wall reactor with temperature controlled at 25° C., by volume: 4.86 mL (6.2 phr (parts per 100 parts of resin)) of water, 0.1361 mL (0.2 phr) of ammonia solution and 70 mL (100 phr) of EPE19A solution. The order of addition is important for the uniformity of the pH and the stability of the emulsion. The solution is then stirred (IKA RW20n motor, stirrer of the 4-vane propeller type) for 10 min. After stabilization of the reaction mixture, 6.80 mL (8.06 phr) of TEOS is introduced. The solution obtained is then stirred for three hours at 20° C. and is then heated at 70° C. for 30 min.

2. Protocol for Synthesis of Nanoparticles with a Size of the Order of 20 nm (Protocol II)

To obtain particles of 20 nm, protocol I is modified, changing the experimental conditions, such as the temperature and the reaction volume. For a volume of resin of 5 L: the procedure then consists of adding, in the stated order, in a double-wall reactor with temperature controlled at 25° C., 540 mL (9.6 phr (parts per 100 parts of resin)) of water and 9.72 mL (0.2 phr) of ammonia solution. After 20 minutes of mechanical stirring (Heidolph RZR2040 motor and stirrer of the anchor type), 5000 mL (100 phr) of the Harzkomb EPE19A solution is introduced. The solution is then stirred for 2 h. After stabilization of the reaction mixture, 558.2 mL (9.3 phr) of TEOS is introduced. The solution obtained is then stirred for 20 hours at 25° C. and is then heated at 70° C. for 3 h.

Thus, when the proportion of water and/or of ammonia is increased, the average diameter of the particles increases. In fact, the rate of hydrolysis is accelerated, which leads to an increase in the number of silica monomers per drop of water.

Example 2

Synthesis of Nanoparticles in a Polyester/Imide Resin (Von Roll Damisol® 3309 Resin, Protocol III)

Example 2 relates to the synthesis of silica nanoparticles having a size of 80 nm, in a precursor of polyester-imide resin that contains a hardener. The catalyst and the silica precursor are the same as those used in example 1.

To obtain particles of 80 nm, the procedure then consists of adding, in the stated order, in a double-wall reactor with temperature controlled at 25° C., by volume, 54 mL (10.3 phr) of water, 0.97 mL (0.2 phr) of ammonia solution and 500 mL (100 phr) of Damisol 3309 solution. The solution is then stirred (IKA RW20n motor, stirrer of the 4-vane propeller type) for 10 min. After stabilization of the reaction mixture, 48.56 mL (8.6 phr) of TEOS is introduced. The solution obtained is then stirred for three hours at 25° C. and is then heated at 70° C. for 30 min to 1.5 h.

Example 3

Example 3 describes the production of solid (hardened) samples starting from reaction mixtures obtained by the protocols of examples 1 and 2.

This production of solid samples may be carried out according to two systems:

1. Two-Component System:

This consists of using a two-component resin comprising the base resin on the one hand and the crosslinking agent and/or catalyst on the other hand. Formation of the network in three dimensions and hardening of the resin take place after mixing the two components. This reaction is accelerated by heat.

In the case of the invention, in example 1, the doped Harzkomb EPE19A solution (protocol I and II) corresponds to the first component, which will react in the presence of the Harzkomb EPE19B solution (hardener based on acid anhydride).

For making the reference, then called EPE19, according to the manufacturer's data ⅔ of EPE19A is mixed with ⅓ of EPE19B. The solution obtained is then poured into a mold with thickness of 1 mm preheated to 100° C. The filled mold is then placed in a stove at 100° C. for 18 h and at 140° C. for 4 h.

2. Single-Component System:

This consists of using a formulated resin, i.e. the hardener and the resin are in the same batch. Crosslinking is then initiated by heat.

The mixtures obtained according to protocol III are based on Damisol 3309, complete formulation comprising a hardener, supplied by Von Roll. The method employed for obtaining plates with a thickness of 1 mm consists of pouring the doped resins according to protocol III into a mold preheated to 100° C. and placed in the stove for crosslinking.

I. Characterization of the Polymers Doped with Silica Nanoparticles Obtained According to the Methods of the Invention 1. Characterization of the Noncrosslinked Polymer Matrixes Doped with Silica Nanoparticles The various doped matrixes obtained in examples 1 and 2 above were characterized before crosslinking (hardening) by analysis of the viscosity and of the morphology of the silica nanoparticles.

1.1 Morphological Characterization

In order to characterize the silica nanoparticles, the doped matrixes were dissolved in a solvent. The solvent used here is acetone. The silica nanoparticles were recovered by sedimentation, by centrifuging the solutions of dissolved matrixes.

Figure 2:
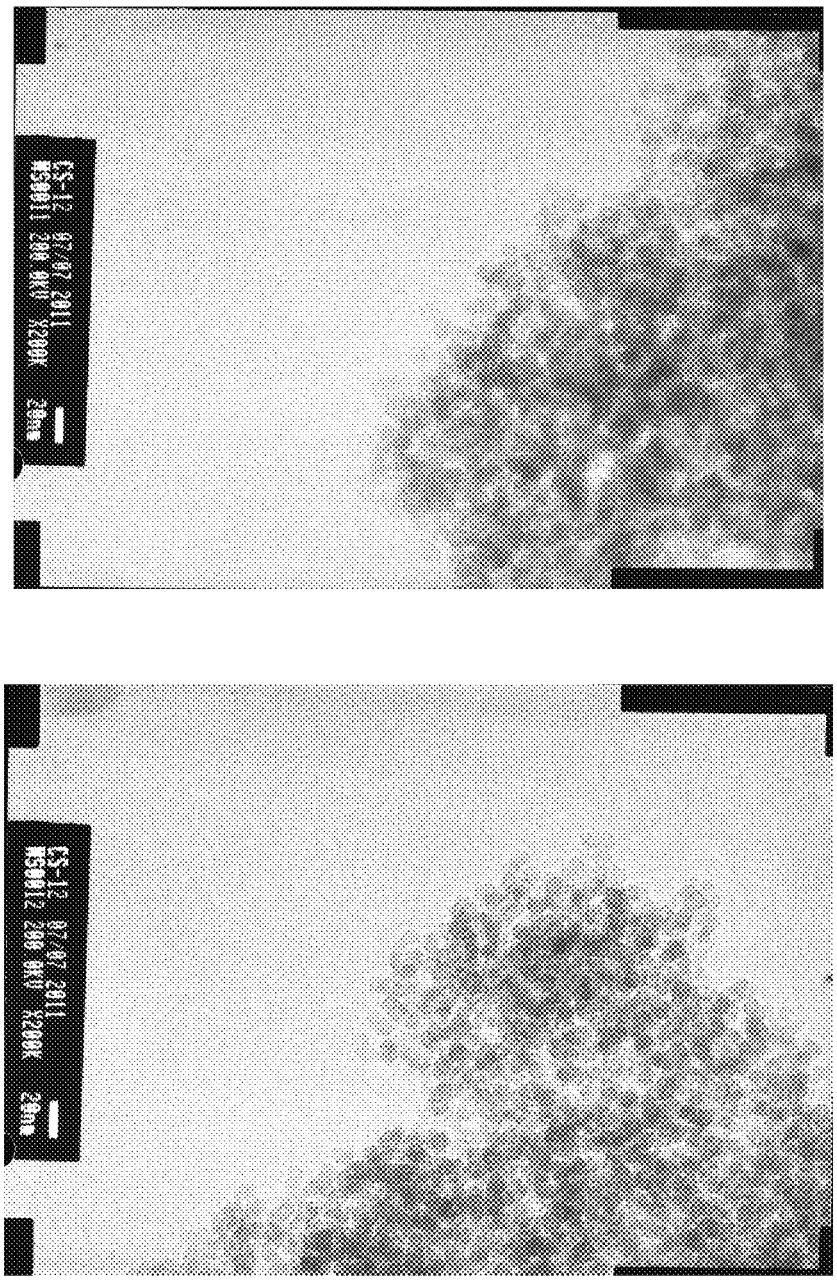
FIG. 2 shows images taken with the transmission electron microscope (TEM), revealing the morphology, size and distribution of the silica nanoparticles synthesized according to protocol II of example 1 (magnification ×200K)

The images obtained by transmission electron microscopy (TEM JEOL 2000FX) make it possible to determine the morphology, size and distribution of the nanoparticles, showing two sizes (50 nm and 20 nm respectively) of spherical silica nanoparticles corresponding to the two protocols I and II for synthesis of silica nanoparticles in the polyester/epoxy resin Harzkomb EPE19A (FIGS. 1 and 2).

Figure 3:
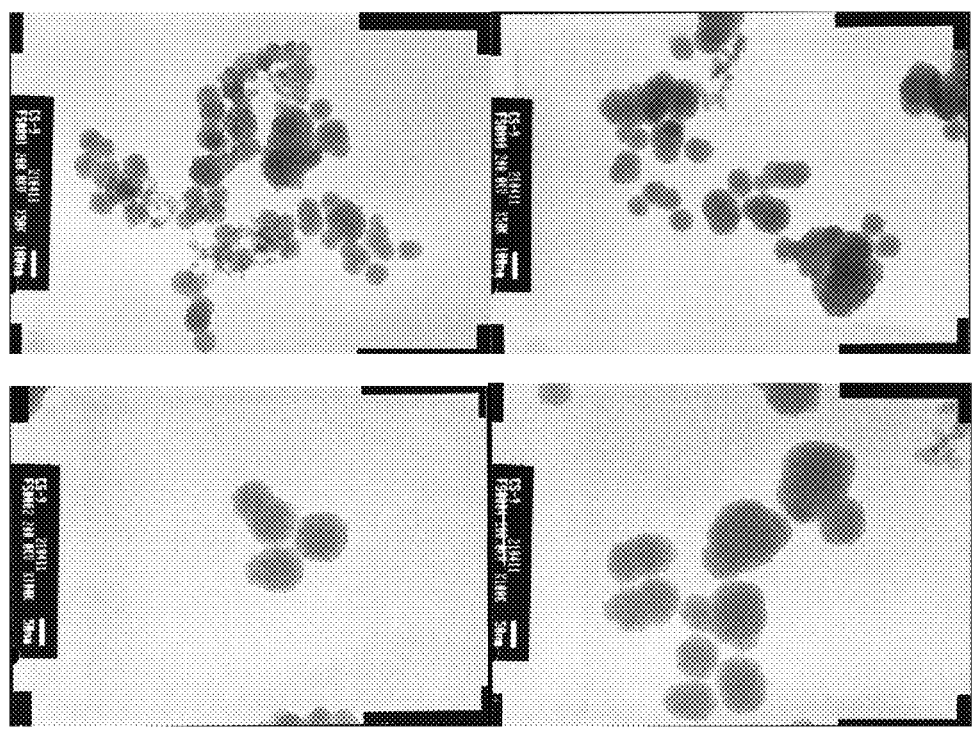
FIG. 3 shows images taken with a transmission electron microscope (TEM), revealing the morphology, size and distribution of the silica nanoparticles synthesized according to protocol III of example 2 (magnification x×50K and ×100K)

Moreover, the TEM images of the samples from the syntheses following protocol III confirm the presence of spherical nanoparticles having a diameter of 80 nm (FIG. 3).

1.2 Characterization of Viscosity

Viscosity is an important parameter for the application of resins in the medium and high voltage industry, since the VPI process (vacuum-pressure impregnation), which is the commonest process used for impregnation of high voltage motors and generators as well as of traction motors, requires a viscosity below 300 cP at room temperature. Whether for total impregnation or bar by bar, this process consists of:

1) putting the preheated object in a tank under vacuum; establishing the vacuum, 2) transferring the resin under vacuum, closing the tap of the vacuum pump; observing the impregnation time, in this case 6 hours, 3) breaking the vacuum; releasing the pressure, and 4) transferring the resin to a reserve tank; putting the object in the stove and polymerizing.

However, the viscosity of the resin has a tendency to increase considerably on adding a filler such as silica and especially on adding nanoparticles. In fact, for one and the same weight of silica introduced in nanometric form into a polymer matrix, the increase in specific surface of the polymer is considerable relative to that of microparticles, which leads to an increase in viscosity.

Viscosity measurements were carried out at 23° C. with the Brookfield® DV-II+Pro viscometer. The dynamic viscosities of the resins are presented in Table 1 below:

TABLE 1

Synoptic table of the viscosities of the doped resins

| Syntheses according to the protocol | Viscosity (cP) at 23° C. |
|---|---|
| Protocol I | 144.9 |
| Protocol II | 80 |
| EPE19A resin | 90 |
| Protocol III | 212 |
| Damisol 3309 resin | 150 |

The above results show that the influence of the nanoparticles on the viscosity is minimized by the methods of the invention. The synthesis and growth of the porous nanoparticles in the matrix mean that the particles and the matrix are closely intermingled. The nanoparticles are in stable suspension and do not have an influence on the rheological behavior of the resin.

2. Characterization of the Crosslinked (Hardened) Matrixes Doped with Silica Nanoparticles 2.1 Electrical Characterization:

Electrical characterization was carried out by measuring the space charges using the thermal step method between each electrical packaging.

Analysis by the thermal step method was carried out after four different treatments:

Virgin samples not submitted to a voltage
Samples submitted to 5 kV at 25° C. for 2 h
Samples submitted to 10 kV at 25° C. for 2 h
Samples submitted to 10 kV at 60° C. for 2 h The purpose of these treatments was to clearly show the effect of voltage and temperature on the space charge, which is characteristic of the presence of impurities and defects in the insulator, which create, locally, electrical, mechanical and/or even chemical stresses.

The characteristics of the samples obtained according to protocol I of the invention are presented in Table 2.

TABLE 2

| | Formulations | | | | |
|---|---|---|---|---|---|
| | Experiment No. | Silica, % | Particle size (nm) | Heating | Relative permittivity εr |
| Protocol I | 17 | 6.2 | 50 | 18 h at 100° C. + 4 h at 140° C. | 7.27 |
| | 16 | 5.3 | | 18 h at 100° C. + 4 h at 140° C. | 4.72 |
| | 18 | 8.7 | | 65 h at 100° C. + 4 h at 140° C. | 2.73 |

Measurement of the thermal wave on the virgin samples (before electrical treatment) made it possible to verify that the samples did not have significant space charges connected with their manufacture.

Figure 4:
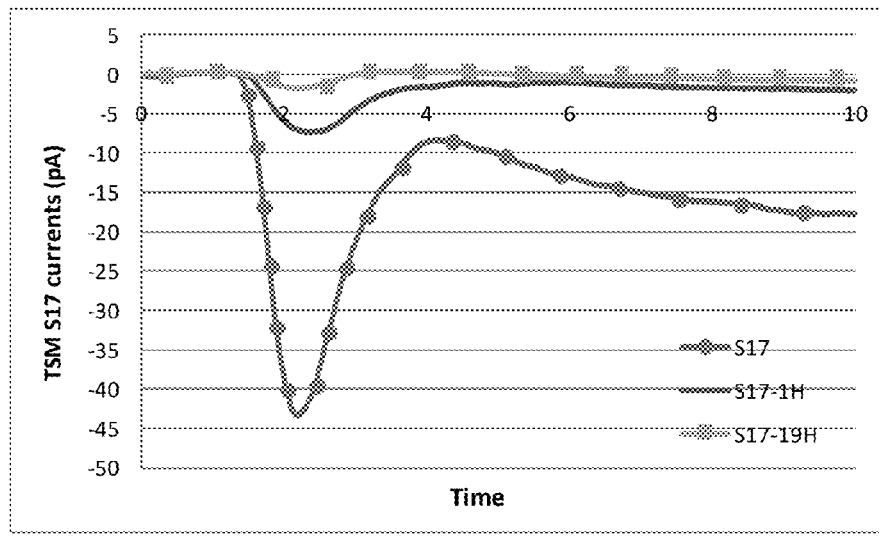
FIG. 4 shows the variation of the TSM current of sample 17 obtained by protocol I of example 1 measured at 10 kV, 25° C. for 2 h.

The next two treatments (5 kV and 10 kV at 25° C. for 2 h) showed that samples 17 and 18 had a tendency to dissipate the space charge. In fact, three characterizations were carried out at 30 minutes, at 1 hour and at 19 hours after electrical treatment of the samples. The results presented in FIG. 4 show that between these characterizations, the amplitudes of the thermal wave currents decreased significantly. Thus, these samples dissipate the charges trapped during the treatment. Only sample 16 keeps an almost constant quantity of space charge even after 19 hours of short-circuiting. The flow of the charges during the treatment reflects an evolution of the properties of the material during the test that may be associated either with incomplete polymerization of the sample, or phenomena of movement of the chains of particles under the effect of the electric field. However, the tendency to dissipate the space charge makes it possible to avoid accumulation of space charges and therefore decrease the zones of electrical stresses, which is favorable for an electrical insulator.

To evaluate the effect of temperature on the samples, treatment at 10 kV at 60° C. was carried out for 2 hours.

Figure 5:
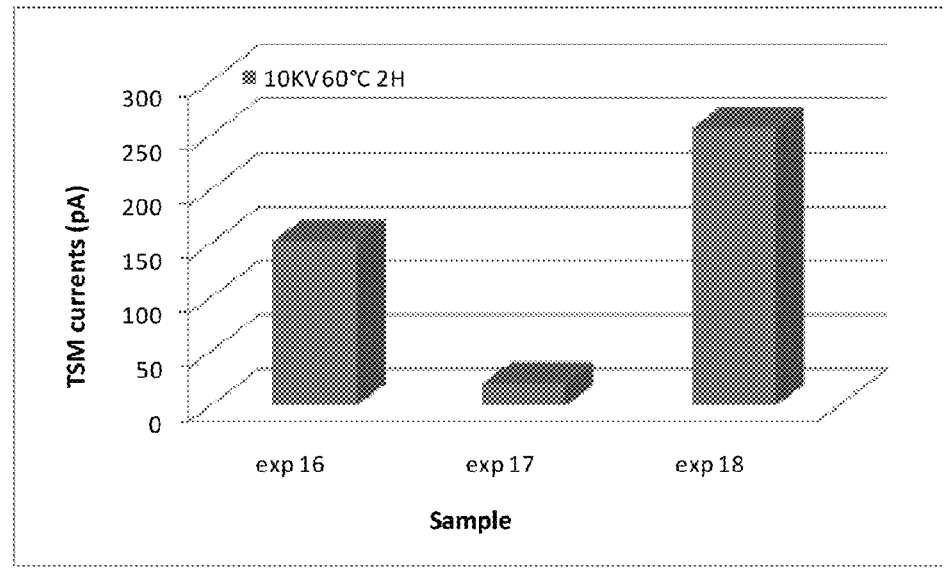
FIG. 5 is a diagram showing the maxima of TSM thermal wave currents at 10 kV at 60° C. for 2 hours, measured on samples 16, 17 and 18.

The diagram shown in FIG. 5 gives the maxima of the thermal wave currents for the two treatments at 10 kV and 60° C. for 2 hours that were carried out on the same sample.

The data in this figure show that sample 17 is the one that accumulates the space charge least, in contrast to sample 18, which appears to have been affected more by the thermoelectric stress. Thus, sample 17 withstands the thermoelectric stresses better than sample 18, which nevertheless remains a good insulator.

Figure 6:
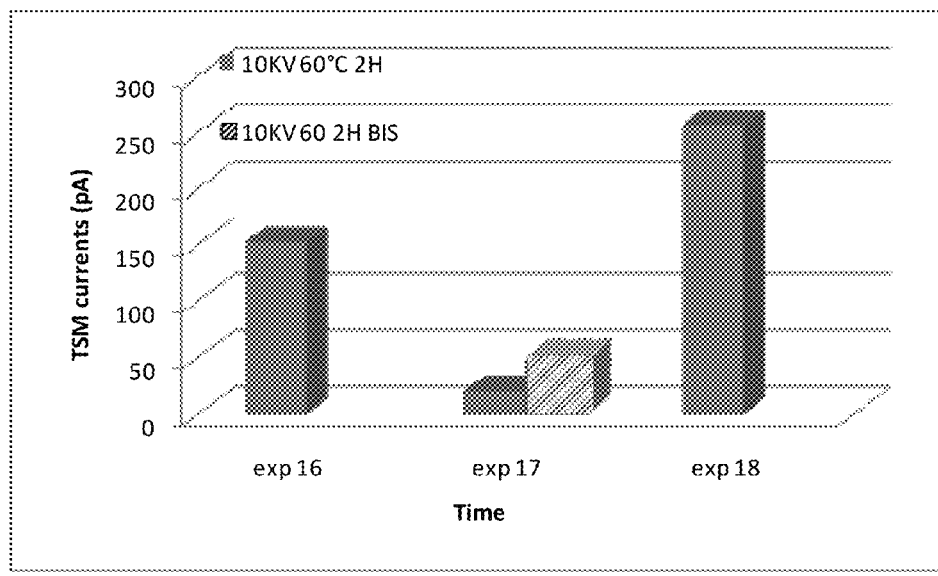
FIG. 6 is a diagram showing the maxima of TSM thermal wave currents at 10 kV at 60° C. for 2 hours, measured for a second time on samples 16, 17 and 18.

To confirm the surprising results obtained for sample 17, a new treatment of 10 kV, 60° C. for 2 h was applied to it. As shown in FIG. 6, despite the addition of this electrical treatment, this sample is still broadly the one that accumulates space charges the least. Thus, this treatment makes it possible to obtain a material accumulating space charge less, i.e. having better resistance to the electrical stresses. The material synthesized according to the method of the invention therefore has improved insulating properties.

2.1 Thermal Characterization:

The introduction of silica nanoparticles into the polymer matrixes according to the invention does not degrade the thermal properties of the latter, as is shown by the values of glass transition and thermal diffusivity of the samples obtained from the polymer matrixes doped with nanoparticles obtained according to the methods of the invention (Table 3).

TABLE 3

Glass transitions and thermal diffusivities of the plates made according to synthesis protocols I and III

| | Formulations | |
|---|---|---|
| | Tg | Thermal diffusivity ($m^2/s$) |
| Protocol I | 63 | 0.08 |
| EPE19 resin (supplier's data) | 90 | 0.08 |
| Protocol III | 65 | 0.105 |
| Damisol 3309 resin | 66 | 0.10 |

Figure 7:
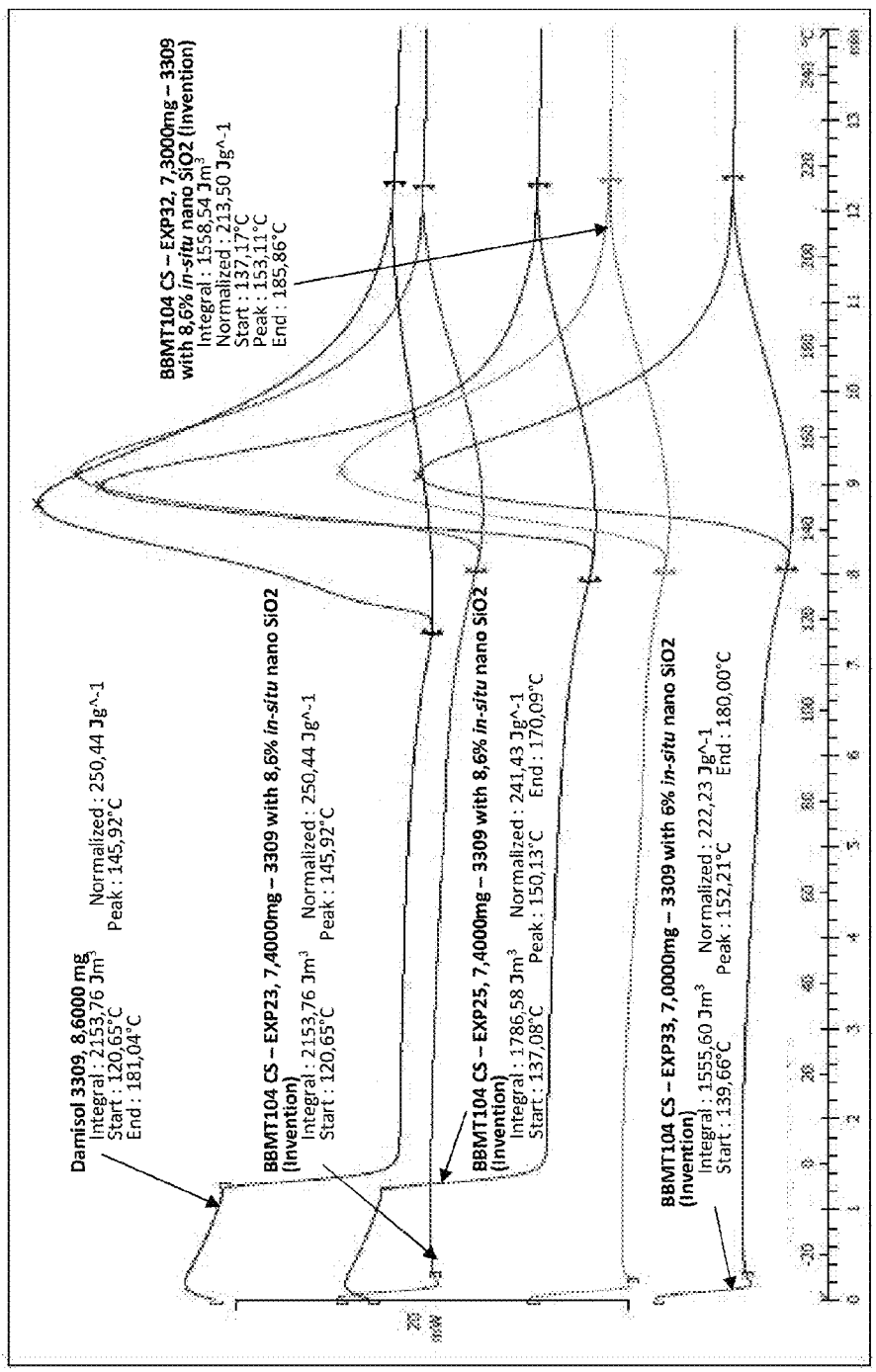
FIG. 7 shows the thermographs from differential scanning calorimetry (DCS) of the samples obtained from the polymer matrix doped with silica nanoparticles synthesized according to protocol III of example 2.

Moreover, the exothermic behavior due to formation of the three-dimensional network, in the doped polymer matrixes of the invention, remains comparable to that of the basic polymer, as is confirmed by the thermographs in FIG. 7. In fact, the baking temperatures are determined relative to the exothermic peaks, which are all equivalent here.

Figure 8:
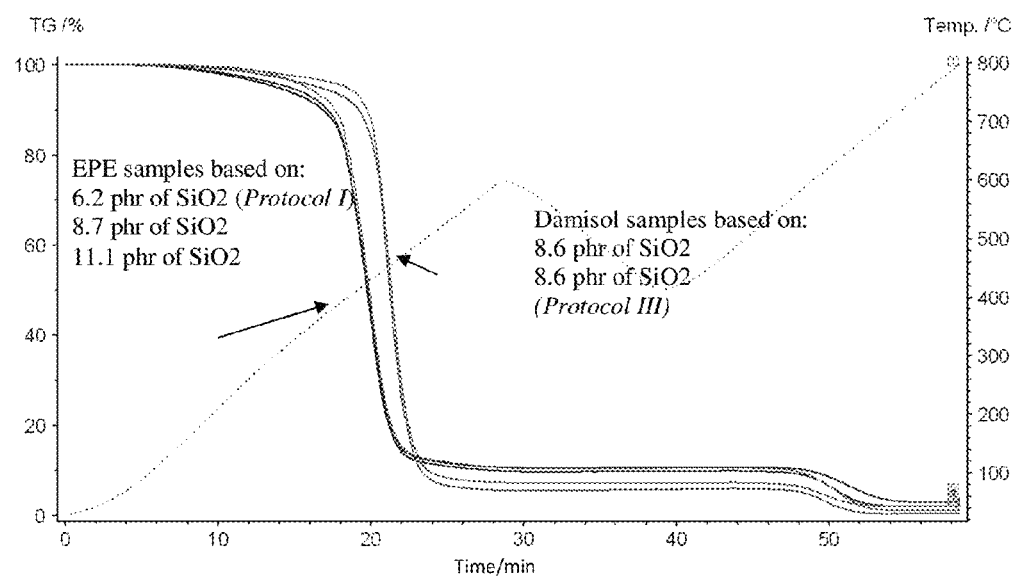
FIG. 8 shows the results of thermogravimetric analysis of the thermal stability of the polymer matrixes doped with silica nanoparticles synthesized by protocols I and III of the invention, after thermal degradation of these polymer matrixes under nitrogen and oxygen.
Figure 9:
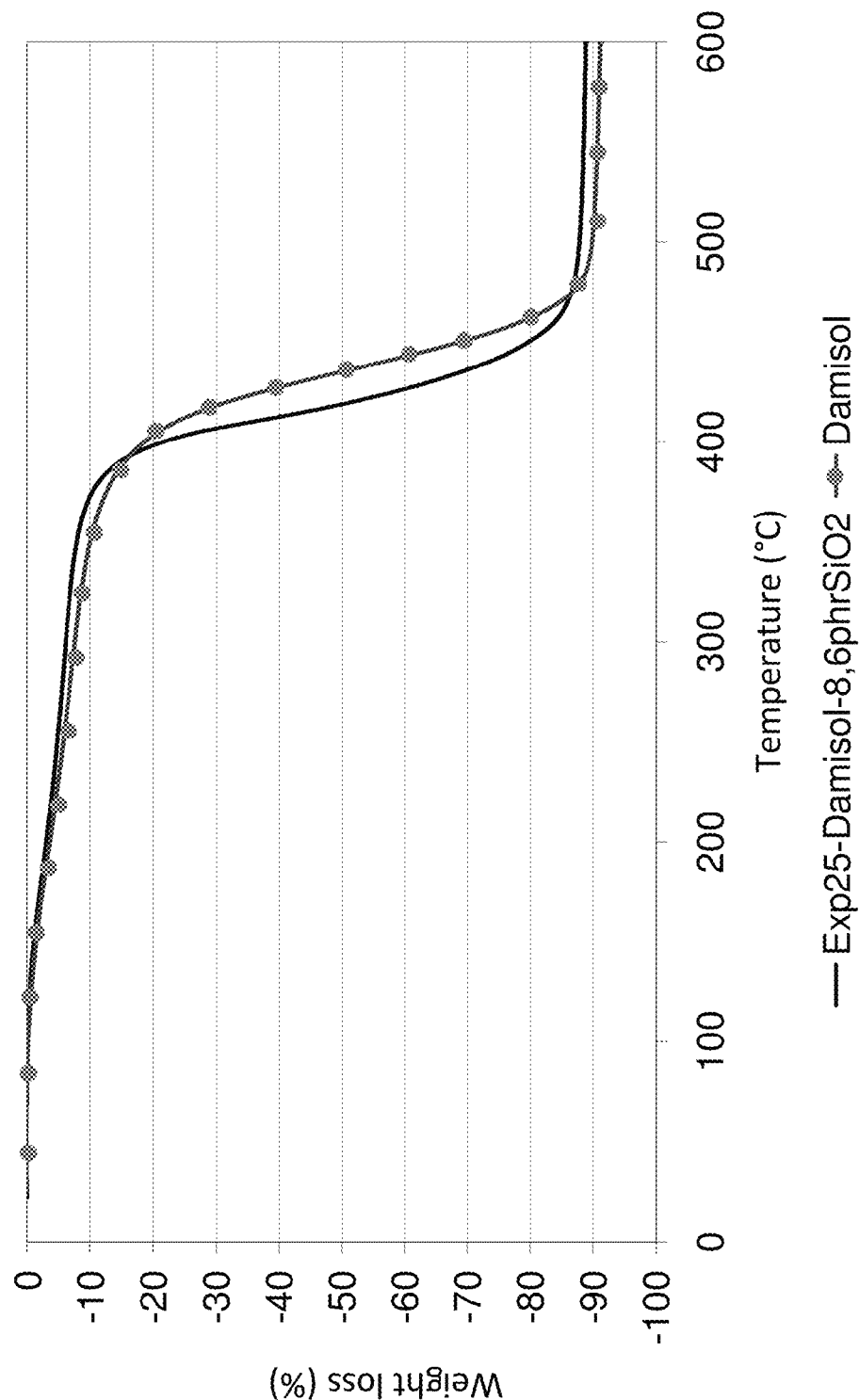
FIG. 9 shows the results of thermogravimetric analysis of the thermal stability of the polymer matrixes doped with silica nanoparticles synthesized by protocol I of the invention, after thermal degradation of these polymer matrixes under nitrogen only.
Figure 10:
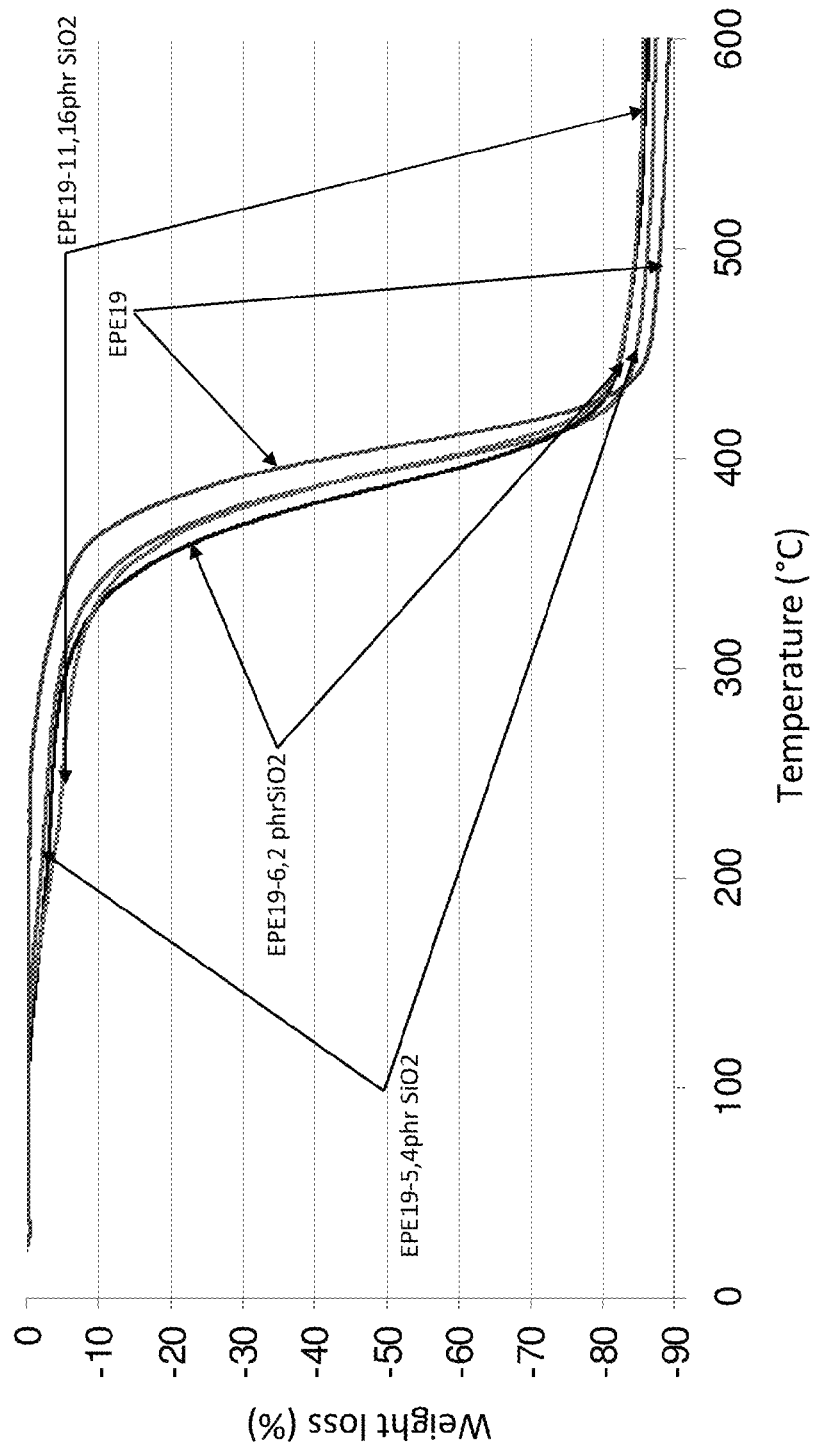
FIG. 10 shows the results of thermogravimetric analysis of the thermal stability of the polymer matrixes doped with silica nanoparticles synthesized by protocol III of the invention, after thermal degradation of these polymer matrixes under nitrogen only.

The thermal stability of the polymer matrixes doped with silica nanoparticles synthesized according to protocols I and III is measured by thermogravimetric analysis (TGA) after thermal degradation under nitrogen and oxygen (FIG. 8) and under nitrogen only (FIGS. 9 and 10) of materials comprising these polymer matrixes.

The thermal degradation of the polymer matrixes doped with silica nanoparticles synthesized according to protocols I and III only shows slight change relative to that of the basic polymer matrix. Doping with silica nanoparticles therefore does not alter the three-dimensional structure of the network, which is reflected in identical thermal stability between the base resin and doped resins.

The invention claimed is:

1. A method for in-situ synthesis of silica nanoparticles in a thermosetting polymer matrix,
   wherein the method comprises the following steps:
   a) forming an aqueous phase-organic phase inverted emulsion, in which the aqueous phase comprises at least one basic catalyst and the organic phase comprises at least one noncrosslinked (co)polymer precursor selected from a precursor of aliphatic, cycloaliphatic or aromatic epoxy resin, a polyester-imide precursor, a precursor of unsaturated polyester/epoxy (co)polymer, a precursor of polyether/epoxy (co)polymer and a polyurethane precursor;
   b) introducing at least one silica precursor into the inverted emulsion formed in step a) forming a complete network whose rate of hydrolysis is greater than the rate of crosslinking of the (co)polymer and
   c) stirring the mixture obtained in step b) and heating to a temperature between 20° C. and 70° C., and wherein no step of functionalization of the polymer precursor is carried out and no solvent or coupling agent is added.

2. The method as claimed in claim 1, wherein the basic catalyst is selected from ammonia or urea.

3. The method as claimed in claim 1, wherein the silica precursor forming a complete network is selected from the group consisting of tetraethoxysilane (TEOS), tetramethoxysilane (TMOS), tetrakis(2,2,2-trifluoroethoxy)silane and tetrakis(1,1,1,3,3,3-hexafluoropropoxy)silane.

4. The method as claimed in claim 1, characterized in that the precursor is a precursor of polyether/epoxy (co)polymer or a precursor of polyester-imide polymer and in that steps a) and b) are carried out in a double-wall reactor with temperature controlled at 20° C. and step c) is carried out at 70° C.

5. The method as claimed in claim 1, wherein the ratio of the weight of silica precursor to the weight of (co)polymer precursor is between 1/100 and 35/100.

6. The method as claimed in claim 1, wherein in step a) the noncrosslinked (co)polymer precursor does not contain hardener and in that it comprises a step of adding hardener to the mixture obtained after step c).

7. The method as claimed in claim 6, wherein the hardener is a hardener based on acid anhydride.

8. The method as claimed in claim 6, wherein the hardener is selected from the group consisting of methylhexahydrophthalic anhydride (MHHPA), methyltetrahydrophthalic anhydride (MTHPA), phthalic anhydride (PA), tetrahydrophthalic anhydride (THPA), and hexahydrophthalic anhydride (HHPA).

9. The method as claimed in claim 1 wherein the ratio of the weight of silica precursor to the weight of (co)polymer precursor 9/100.

10. A method for synthesis of a thermoset polymer matrix doped with silica nanoparticles comprising the following steps:
- a1) carrying out the method as claimed in claim 1,
- b1) heating the thermosetting matrix doped with silica nanoparticles obtained in step a1) to the temperature of hardening of the polymer matrix.

11. A method for in-situ synthesis of silica nanoparticles in a thermosetting polymer matrix, wherein the method comprises the following steps:
- a) forming an aqueous phase-organic phase inverted emulsion, in which the aqueous phase comprises at least one basic catalyst and the organic phase comprises at least one noncrosslinked (co)polymer precursor selected from a precursor of aliphatic, cycloaliphatic or aromatic epoxy resin, a polyester-imide precursor, a precursor of unsaturated polyester/epoxy (co)polymer, a precursor of polyether/epoxy (co)polymer and a polyurethane precursor;
- b) introducing at least one silica precursor into the inverted emulsion formed in step a) forming a complete network whose rate of hydrolysis is greater than the rate of crosslinking of the (co)polymer and
- c) stirring the mixture obtained in step b) and heating to a temperature between 20° C. and 70° C., and wherein in step a) the noncrosslinked (co)polymer precursor does not contain hardener, and wherein the method comprises a step of adding a hardener to the mixture obtained after step c).

12. The method as claimed in claim 11, wherein no step of functionalization of the polymer precursor is carried out and no solvent or coupling agent is added.

13. The method as claimed in claim 11, wherein the basic catalyst is selected from ammonia or urea.

14. The method as claimed in claim 11, wherein the silica precursor forming a complete network is selected from the group consisting of tetraethoxysilane (TEOS), tetramethoxysilane (TMOS), tetrakis(2,2,2-trifluoroethoxy)silane and tetrakis(1,1,1,3,3,3-hexafluoropropoxy)silane.

15. The method as claimed in claim 11, characterized in that the precursor is a precursor of polyether/epoxy (co)polymer or a precursor of polyester-imide polymer and in that steps a) and b) are carried out in a double-wall reactor with temperature controlled at 20° C. and step c) is carried out at 70° C.

16. The method as claimed in claim 11, wherein the ratio of the weight of silica precursor to the weight of (co)polymer precursor is between 1/100 and 35/100.

17. The method as claimed in claim 11, wherein the hardener is a hardener based on acid anhydride.

18. A method for synthesis of a thermoset polymer matrix doped with silica nanoparticles comprising the following steps:
- a1) carrying out the method as claimed in claim 11,
- b1) heating the thermosetting matrix doped with silica nanoparticles obtained in step a1) to the temperature of hardening of the polymer matrix.

19. The method as claimed in claim 11, wherein the hardener is selected from the group consisting of methylhexahydrophthalic anhydride (MHHPA), methyltetrahydrophthalic anhydride (MTHPA), phthalic anhydride (PA), tetrahydrophthalic anhydride (THPA), and hexahydrophthalic anhydride (HHPA).

20. The method as claimed in claim 11, wherein the ratio of the weight of silica precursor to the weight of (co)polymer precursor 9/100.

* * * * *